US010123631B2

(12) United States Patent
Sizer et al.

(10) Patent No.: US 10,123,631 B2
(45) Date of Patent: Nov. 13, 2018

(54) OPERATING SYSTEM FOR, AND A METHOD OF, OPERATING AN ARTICLE OF FURNITURE

(71) Applicant: King Furniture Australia Pty Ltd., Turrella (AU)

(72) Inventors: Geoffrey David Sizer, Turramurra (AU); Gregory Michael Rosser, Sydney (AU); Jesse Alan Kovac, Lindfield (AU); James Lawson-Craig, Hornsby (AU); Benjamin Watson Barnes, Darlinghurst (AU); Bin Xia, Eastwood (AU); David King, Turrella (AU); Ryan Lawson, Turrella (AU); Tanya Rechberger, Turrella (AU); Anastasie Panagopoulos, Turella (AU); John Levey, Turrella (AU)

(73) Assignee: King Furniture Australia Pty Ltd., Turrella (AU)

( * ) Notice: Subject to any disclaimer, the term of this patent is extended or adjusted under 35 U.S.C. 154(b) by 0 days.

(21) Appl. No.: 15/515,904

(22) PCT Filed: Oct. 14, 2015

(86) PCT No.: PCT/AU2015/050626
§ 371 (c)(1),
(2) Date: Mar. 30, 2017

(87) PCT Pub. No.: WO2016/058045
PCT Pub. Date: Apr. 21, 2016

(65) Prior Publication Data
US 2017/0295949 A1     Oct. 19, 2017

(30) Foreign Application Priority Data

Oct. 15, 2014  (AU) ................................ 2014904114
Dec. 10, 2014  (AU) ................................ 2014904998

(51) Int. Cl.
G08C 19/16      (2006.01)
A47C 31/00      (2006.01)
(Continued)

(52) U.S. Cl.
CPC ............ *A47C 31/008* (2013.01); *A47C 17/04* (2013.01); *G06F 3/04883* (2013.01); *G08C 17/02* (2013.01)

(58) Field of Classification Search
None
See application file for complete search history.

(56) References Cited

U.S. PATENT DOCUMENTS 9,089,114 B2 *  7/2015  Eucker ................... A01K 65/00
9,098,114 B2 *  8/2015  Potter ..................... G06F 3/017
(Continued)

OTHER PUBLICATIONS

International Search Report and Written Opinion; dated Dec. 24, 2015; PCT/AU2015/050626.
(Continued)

Primary Examiner — K. Wong
(74) Attorney, Agent, or Firm — Banner & Witcoff, Ltd.

(57) ABSTRACT

An operating system (10) for operating an article of furniture (12), the article of furniture (12) comprising a support structure, at least one component displaceably arranged relative to the support structure and a receiver. The operating system (10) includes a (controller 34) which communicates wirelessly with the article of furniture (12), the controller (34) outputting operating signals (46) containing operating instructions. A signal processing module communicates with the wireless controller (34) via a routing arrangement (48), the signal processing module receiving the operating signals (46) and converting the operating signals into control signals to be provided to the receiver to effect displacement of the
(Continued)

at least one component of the article of furniture (12) relative to the support structure under the control of a user.

7 Claims, 7 Drawing Sheets

(51) Int. Cl.
*A47C 17/04* (2006.01)
*G08C 17/02* (2006.01)
*G06F 3/0488* (2013.01)

(56) References Cited

U.S. PATENT DOCUMENTS

| | | |
|---|---|---|
| 2008/0262657 A1 | 10/2008 | Howell et al. |
| 2010/0231421 A1 | 9/2010 | Rawls-Meehan |
| 2011/0055720 A1 | 3/2011 | Potter et al. |
| 2011/0245979 A1* | 10/2011 | Koch .................. A47C 1/0242 700/275 |

OTHER PUBLICATIONS

Written Opinion; dated Jul. 14, 2016; PCT/AU2015/050626.
International Preliminary Report on Patentability; dated Feb. 16, 2017; PCT/AU2015/050626.

* cited by examiner

OPERATING SYSTEM FOR, AND A METHOD OF, OPERATING AN ARTICLE OF FURNITURE

CROSS-REFERENCE TO RELATED APPLICATIONS

This application claims is a U.S. National Stage application under 35 U.S.C. § 371 of International Application PCT/AU2015/050626 (published as WO/2016/058045 A1), filed Oct. 14, 2015, which claims the benefit of priority to AU 2014904114, filed on Oct. 15, 2014 and AU 2014904998, filed on Dec. 10, 2014, each of which are hereby incorporated by reference in their entireties.

TECHNICAL FIELD

This disclosure relates, generally, to furniture and, more particularly, to an operating system for, and a method of, operating an article of furniture.

SUMMARY

In a first aspect, there is provided an operating system for operating an article of furniture, the article of furniture comprising a support structure, at least one component displaceably arranged relative to the support structure and a receiver, the operating system including a controller which communicates wirelessly with the article of furniture, the controller outputting operating signals containing operating instructions; and a signal processing module which communicates with the wireless controller via a routing arrangement, the signal processing module receiving the operating signals and converting the operating signals into control signals to be provided to the receiver to effect displacement of the at least one component of the article of furniture relative to the support structure under the control of a user.

The controller may include a human-machine interface (HMI) via which the user can input commands.

The system may include a safety interlock, or anti-entrapment feature, associated with the furniture, the safety interlock monitoring the displacement of the components of the furniture and ceasing displacement of the furniture when at least one predetermined condition is breached.

In an embodiment, the controller may include at least one preset field able to be input by the user to enable the user to displace the position of the at least one component relative to the support structure into a favoured position of the user by the user operating the preset field of the controller.

The article of furniture may have at least one accessory associated with it, the controller further being configured to control operation of the at least one accessory via the signal processing module and the receiver.

The article of furniture may comprise a plurality of components displaceably arranged relative to the support structure, the controller being configured to effect displacement of at least some of the components independently of other of the components.

In an embodiment, the controller may be a smart device with an associated software application. Examples of smart devices include smart phones, tablets, phablets, smart watches, or the like. The software application may be a dedicated application commonly referred to as an "app".

In an embodiment, the controller may include a voice operated input system. In addition, or instead, the smart device may have a display associated with it, the display being a haptic, or touch screen, display. The display may either be built into the device itself or the device may communicate with the display.

The system may include the routing arrangement, the routing arrangement comprising a wireless router and a server in communication with the router, the server, in turn, further communicating with the signal processing module via a Wi-Fi bridge. The signal processing module may communicate with the Wi-Fi bridge, the Wi-Fi bridge having a translator which converts a Wi-Fi signal received from the controller into a signal suitable for the receiver. For example, the translator may convert the Wi-Fi signal into a Bluetooth signal or a signal of a protocol similar to Bluetooth, e.g. Home RF.

In an embodiment, the controller may be a wireless identification device to which the receiver of the article of furniture is responsive. The wireless identification device may, for example, be a biometric or RFID identification device.

In a second aspect, there is provided a method of operating an article of furniture, the article of furniture comprising a support structure, at least one component displaceably arranged relative to the support structure and a receiver, the method including inputting operating commands into a controller to cause the controller to output operating signals containing operating instructions; and wirelessly receiving the operating signals at the receiver of the article of furniture and converting the operating signals into control signals to effect displacement of the at least one component of the article of furniture relative to the support structure under the control of a user.

The method may include monitoring the displacement of the at least one component of the article of furniture and ceasing displacement of the component when at least one predetermined condition is breached.

In a third aspect, there is provided an operating system for operating an article of furniture, the article of furniture comprising a support structure and at least one component displaceably arranged relative to the support structure, the operating system including a proximity responsive interface carried by the article of furniture, the proximity responsive interface having a plurality of gesture responsive components to enable a user, by means of predetermined gestures relative to the gesture responsive components, to control displacement of the at least one component of the article of furniture relative to the support structure; and a signal processing module responsive to the proximity responsive interface, the signal processing module incorporating a memory device in which a preferred setting of the at least one component relative to the support structure is stored, storage and retrieval of the preferred setting being effected by a predetermined manipulation sequence of gestures relative to at least some of the gesture responsive components of the proximity responsive interface.

In one embodiment, the gestures may be touch gestures and each gesture responsive component may be a touch sensitive component. It will therefore be appreciated that, in this embodiment, unless the context clearly indicates otherwise, the term "proximity responsive interface" includes a touch responsive interface.

Each touch sensitive component may comprise a touch sensor, the predetermined manipulation sequence comprising simultaneously touching a number of the touch sensors for a predetermined first period of time to store the preferred setting and touching the same touch sensors for a predetermined second period of time, different from the first period of time, for example, a predetermined second, shorter period of time, to retrieve the preferred setting.

In another embodiment, each touch sensitive component may comprise a touch sensor, the predetermined manipulation sequence comprising touching at least one of the touch sensors a predetermined first number of times and with a predetermined first cadence to store the preferred setting and touching at least one of the touch sensors a predetermined second number of times, different from the first number of times, and with a predetermined second cadence, different from the first cadence, to retrieve the preferred setting.

In a further embodiment, each gesture responsive component may be a proximity sensitive component. Each proximity sensitive component may comprise a proximity sensor. The predetermined manipulation sequence may comprise a user swiping his or her hand contactlessly past at least one of the proximity sensors in a first direction to retrieve the preferred setting for that user. Further, the predetermined manipulation sequence may comprise the user swiping his or her hand contactlessly past at least one of the proximity sensors in a second direction to return the article of furniture to its "home" position.

A plurality of preferred settings may be stored in the memory device of the signal processing module. Different users may be able to access their preferred settings as stored in the memory device by that user swiping his or her hand contactlessly past the at least one proximity sensor in the first direction a predetermined number of times. The predetermined number of times selected may be unique for that user so that only that user's preferred settings are retrieved when the relevant predetermined manipulation sequence is carried out. Based on the disclosure, it is therefore apparent that the term "gesture" includes making contact with the components as by touching and also interacting with the components without making contact, i.e. contactlessly.

BRIEF DESCRIPTION OF DRAWINGS

Embodiments of the disclosure are now described by way of example with reference to the accompanying drawings in which:—

DETAILED DESCRIPTION OF EXEMPLARY EMBODIMENTS

Figure 1:
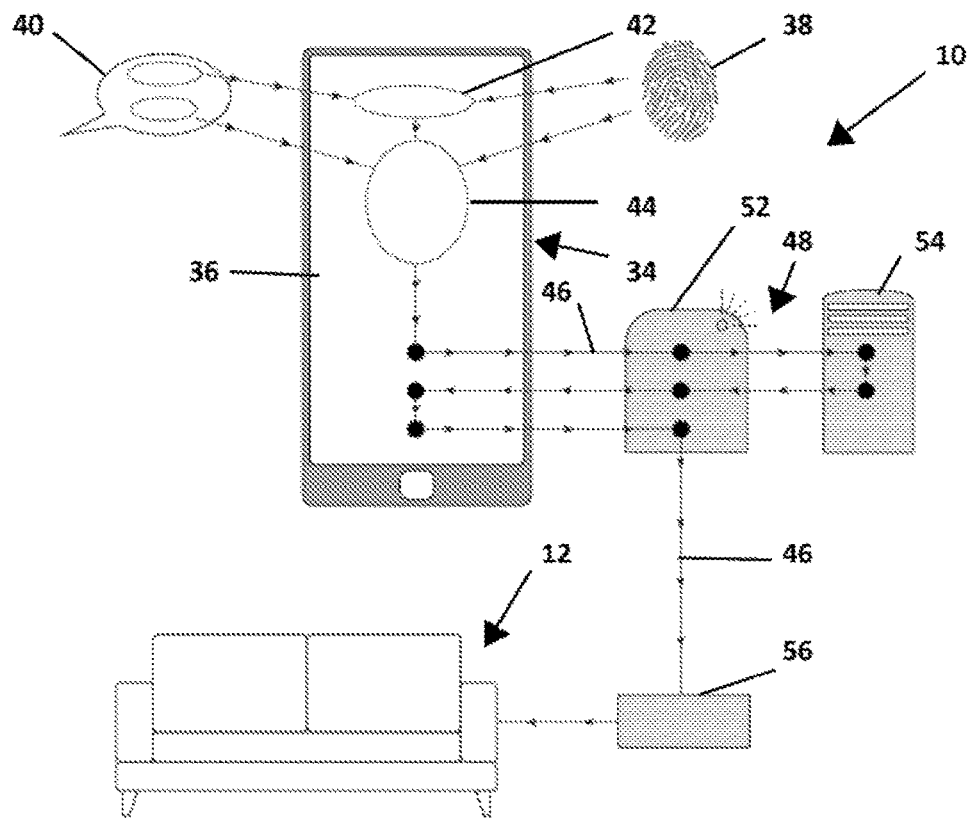
FIG. 1 shows a schematic block diagram of an embodiment of an operating system for operating an article of furniture.

In the drawings, reference numeral 10 generally designates an embodiment of an operating system for operating an article of furniture 12. An embodiment of an article of furniture 12 is shown in greater detail in FIG. 2 of the drawings.

The article of furniture 12 includes a support structure, or base, 14 and a plurality of components 16, 18, 20 and 22.

The component 16 is a headrest, the component 18 is a backrest, the component 20 is a seat and the component 22 is a footrest. The headrest 16 is displaceable relative to the backrest 18 via a displacement mechanism in the form of an actuator motor 24.

The seat 20 can be extended relative to the base 14 independently of the backrest 18 and headrest 16. The seat 20 is displaceable relative to the base 14 under the action of a displacement mechanism in the form of an actuator motor 26. When the seat 20 is extended relative to the base 14, the footrest 22 extends to the position shown in FIG. 2 of the drawings. The mechanism by which the footrest 22 is displaced relative to the seat 20 is omitted from FIG. 2 of the drawings for the sake of clarity.

The article of furniture 12 further includes a receiver 28. The receiver 28 receives signals from a proximity responsive interface 29 of the article of furniture 12. In the illustrated embodiment, the proximity responsive interface is shown as carried by the seat 20 of the article of furniture 12. It will, however, be appreciated that the proximity responsive interface 29 could be carried on a different component of the article of furniture 12 such as, for example, an armrest 31, the base 14, or elsewhere on the article of furniture 12.

Figure 2:
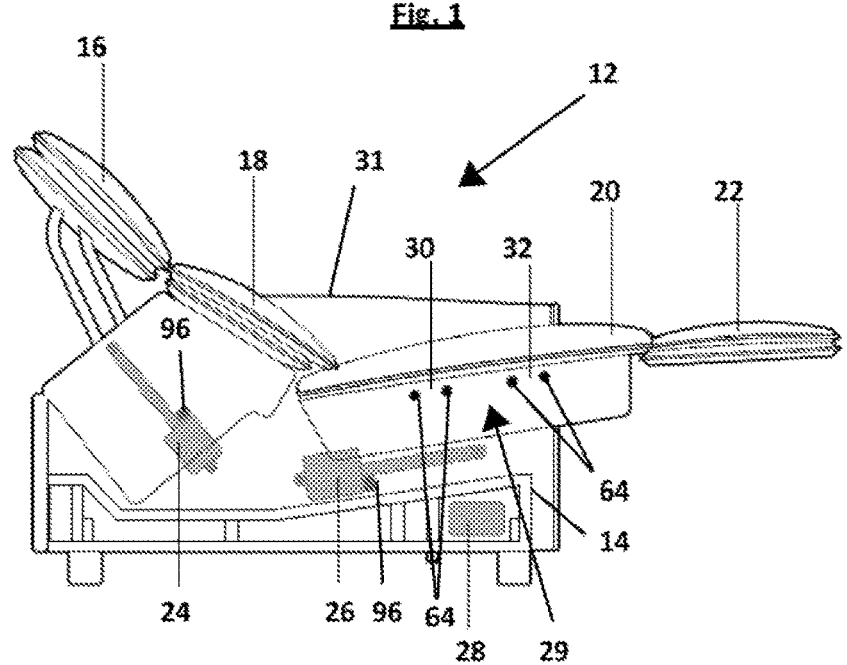
FIG. 2 shows a schematic, sectional side view of an embodiment of the article of furniture with parts of a displacement mechanism of the article of furniture being omitted for the sake of clarity.

The proximity responsive interface 29 comprises sensors 30 and 32 which, in the embodiment illustrated in FIG. 2 of the drawings, are touch responsive components, in the form of touch sensors arranged on the seat 20 of the article of furniture 12. The receiver 28 is a dual channel switch unit for both motors 24 and 26 and incorporates a memory as well as wireless and wired (if required) connectivity.

The system 10 includes a controller 34 which communicates wirelessly with the receiver 28 of the article of furniture. Thus, the receiver 28 acts as a wireless base station for the controller 34 to control the article of furniture 12. Internally within the article of furniture 12, the receiver 28 communicates either wirelessly or via cable with the actuator motors 24, 26 of the article of furniture 12.

The controller 34 can adopt various forms. In the embodiment illustrated in FIG. 1 of the drawings, the controller 34 is illustrated as a smart device such as, for example, a smart phone, a tablet, a phablet, a smart watch, or the like. For ease of explanation, the controller 34 will be described in this embodiment with reference to the controller 34 being a smart phone and will be referred to as the device 34. In other embodiments, the controller 34 is implemented as a wireless key fob control, an internet-based controller, an intranet-based controller, or the like.

The device 34 includes a display 36 and an installed software application which is bespoke for controlling the operation of the article of furniture 12. Such a software application is commonly referred to as an "app". The user controls operation of the device 34 using the installed app. The display 36 is a haptic display, or touchscreen, and the user controls operation of the device 34 by touching the display 36, as shown schematically at 38. Instead, or in addition, the device 34 is responsive to voice commands and the user controls operation of the device 34 via the voice commands as shown schematically at 40.

Thus, initially, the user opens the app via a first command as shown at 42 and then initiates control of operation of the article of furniture 12 via a second command 44, the commands being effected either by touch or by voice.

The device 34 emits operating signals 46 which are fed via a routing arrangement 48 to the receiver 28.

The system 10 includes a signal processing module, or microcontroller 50 (FIG. 3), which in the illustrated embodiment, is shown as part of the receiver 28. However, it will be appreciated that the signal processing module, or microcontroller 50, could be a separate unit from the receiver 28.

The microcontroller 50 communicates with the device 34 via the routing arrangement 48 to receive the operating signals 46. The microcontroller 50 converts the operating signals into control signals to control operation of the actuator motor 24 and/or the actuator motor 26.

The routing arrangement 48 includes a Wi-Fi router 52 which communicates with a server 54. The server 54, in turn, communicates with a Wi-Fi bridge 56 which feeds the operating signals 46 to the microcontroller 50 in a suitable format for the microcontroller 50. Thus, the Wi-Fi bridge 56, for example, converts the operating signals 46 into a Bluetooth signal to which the receiver 28 is responsive.

Figure 3:
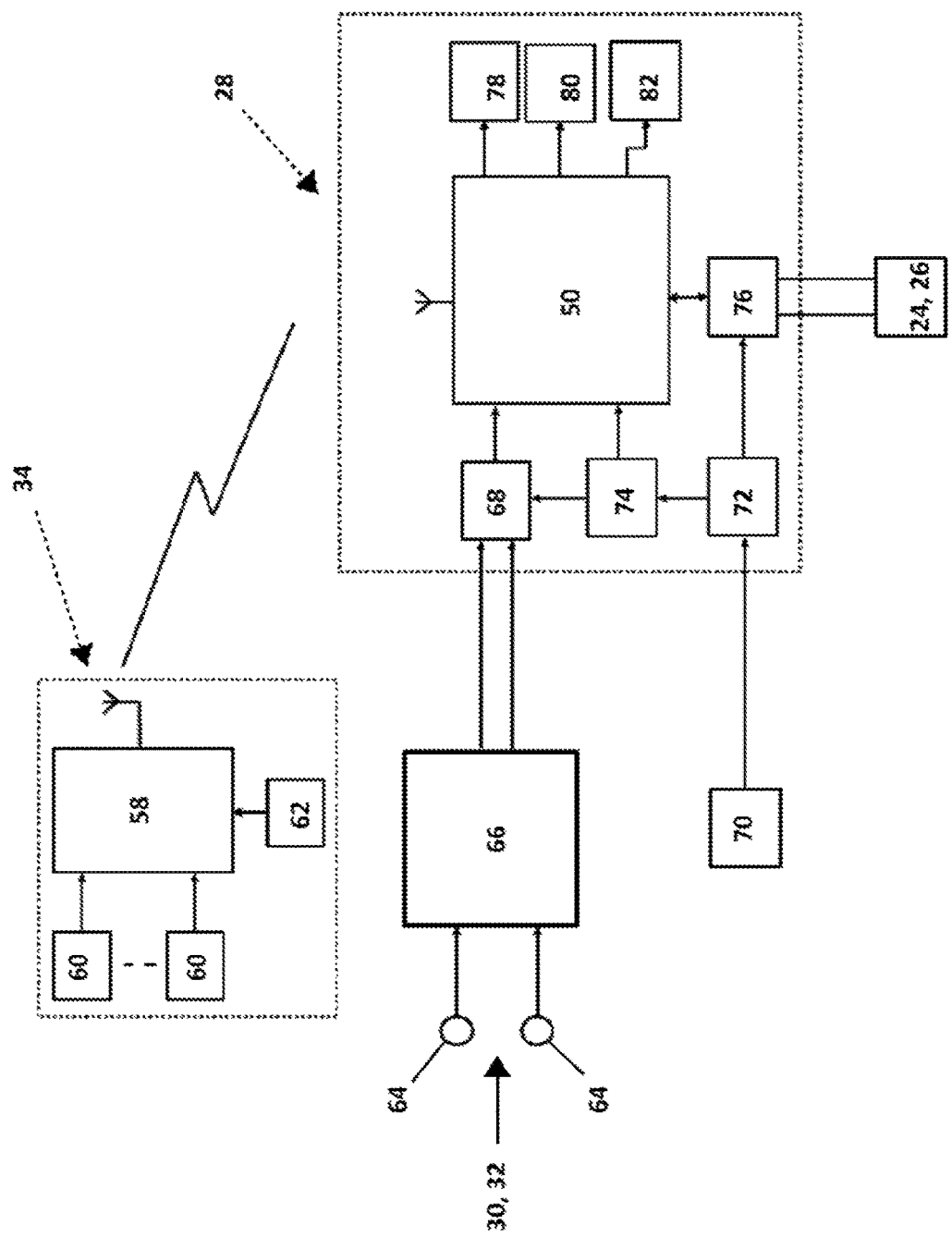
FIG. 3 shows a schematic circuit layout of the operating system.

As shown in greater detail in FIG. 3 of the drawings, the device 34, whether the device of FIG. 1 or some other suitable controller, includes a radio frequency (RF) transmitter 58. Various inputs 60 can be input into the transmitter 58 by the user. As described above, these inputs 60 can be voice inputs, touchscreen inputs, keystroke inputs, mouse (or other pointer device) inputs, or the like. The device 34 further includes a power source in the form of a rechargeable battery 62.

The app associated with the device 34 can store a user's preferred settings. Thus, by way of appropriate inputs 60 into the device 34, the user can control the article of furniture 12 to displace the components 16-22 into that user's preset, preferred setting.

In an embodiment, the device 34 has an electronic identification tag associated with it which is transmitted as part of the operating signal 46 to the article of furniture 12. Thus, different users of the article of furniture 12 can each store their own preferred settings in the receiver 28 of the article of furniture 12 and in the app of their own devices 34. When any user operates the article of furniture 12 using his or her device 34 to set the article of furniture at the user's preferred setting, the microcontroller 50 of the receiver 28 determines the identity of the user via the identification tag of the device 34 and selects the appropriate stored preferred setting for that user.

As described above, the article of furniture 12 also includes the sensors 30 and 32 for controlling operation of the actuator motors 24 and 26. In this embodiment, each sensor 30, 32 includes a pair of touch sensor inputs in the form of buttons 64. Outputs from the buttons 64 feed into a sensor interface circuit 66. The sensor interface circuit 66 communicates with the microcontroller 50 via an electrostatic discharge protection circuit 68.

The system 10 includes a power source 70 which is an electrical power supply and/or a backup battery. An output from the power source 70 feeds via a power protection circuit 72 and a power conditioning circuit 74 to the microcontroller 50 and the protection circuit 68. The power protection circuit 72 further feeds into a motor drive H-bridge circuit 76 which drives the actuator motors 24 and 26.

The receiver 28 also includes a status LED 78, an RS 232 interface 80 and an audio feedback module 82.

In an embodiment, instead of, or in addition to controlling preferred settings of the article of furniture 12 via the device 34, the user can store preferred settings in the memory of the receiver 28 via the touch sensor buttons 64 of the sensors 30, 32. Thus, in one example, by the user simultaneously pressing two of the buttons 64 of the sensors 30, 32 for a predetermined period of time, for example, about 5-10 seconds, the setting in which the components 16-22 of the article of furniture are at that time is stored in the memory of the receiver 28 as the user's preferred setting.

At any time thereafter, when the user presses the same two buttons 64 for a shorter period of time, say about one second or less, the components 16-22 of the article of furniture are displaced into the user's preferred setting.

In another example, the user can store his or her preferred setting by initially tapping one of the buttons 64 of the sensors 30 and 32 and thereafter tapping the same button 64 repeatedly with a predetermined cadence for a predetermined number of times, say about three or four times. When this occurs, the setting of the article of furniture 12 is stored in the memory of the receiver 28. To retrieve that setting at any time thereafter, the user again taps the same button initially and then taps that button repeatedly with a predetermined cadence for a different predetermined number of times, for example, twice. In this way, different users can store their preferred settings in the memory of the receiver 28 using the sensors 30, 32.

Figure 8:
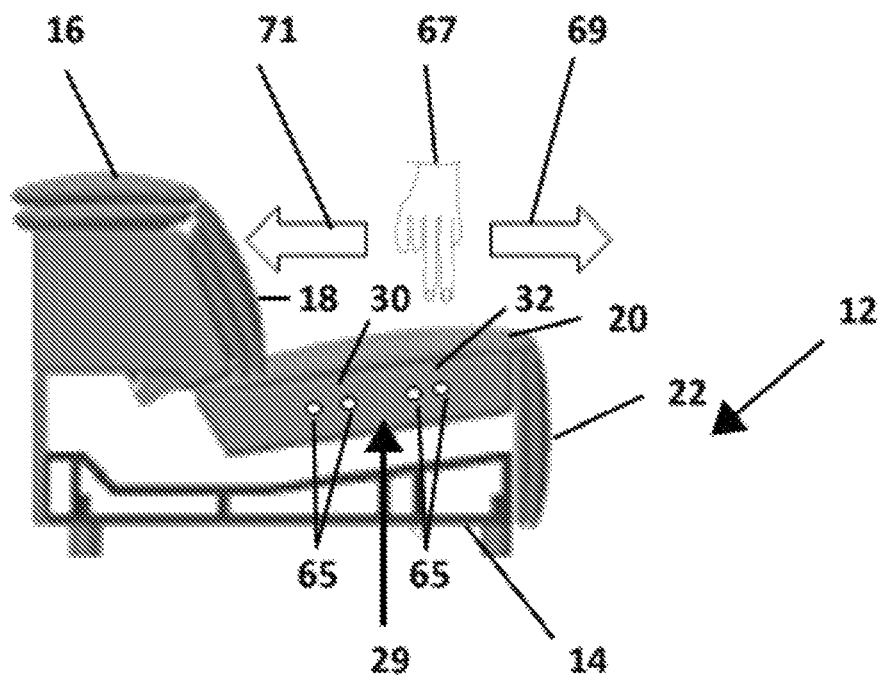
FIG. 8 shows a schematic, side view of a further embodiment of an operating system for operating an article of furniture.

FIG. 8 of the drawings, shows another embodiment of the operation of the article of furniture 12. With reference to the previous drawings, like reference numerals refer to like parts, unless otherwise specified.

In this embodiment, each sensor 30, 32 comprises a pair of proximity sensitive components, or proximity sensors, 65. The predetermined manipulation sequence comprises the user swiping his or her hand 67 over at least one, and, preferably, at least two of the proximity sensors 65 in a first direction, as illustrated by arrow 69, to retrieve the preferred setting for that user when the article of furniture 12 is in its "home" position as shown in FIG. 8 of the drawings.

To cater for different users, the controller 34 is responsive to the number of times the user sweeps his or her hand 67 over the sensors 65 in the direction of arrow 69. Thus, for example, a first user may sweep his or her hand 67 once in the direction of arrow 69 to retrieve the preferred setting of the article of furniture 12 for the first user. A second user sweeps his or her hand 67 in the direction of arrow 69 at least twice to retrieve the second user's preferred setting, etc. Hence, in this way, the preferred settings of the article of furniture 12 for each of a number of users are able to be stored to be retrieved by the relevant user.

When the article of furniture 12 is in the extended position, as shown in FIG. 2 of the drawings, to return the article of furniture 12 to the "home" position, as shown in FIG. 8 of the drawings, the user swipes his or her hand 67 in the direction of arrow 71 across at least one, and, preferably, at least two, of the sensors 65.

It is to be understood that the reference to "hand" may mean the user's entire hand or part of the user's hand such as one or more fingers of the user's hand being swiped across the sensors 65. Further, the reference to the user swiping his or her hand "over" the sensors 65 is intended to encompass both making contact with the sensors 65 and the user's hand 67 passing over, but not in contact with, the sensors 65.

In still another embodiment of the controller 34, the controller 34 can be implemented as a wireless identification device such as a biometric sensor, RFID sensor, or the like to which the receiver 28 is responsive to operate the motors 24 and 26. In this latter embodiment, a user's preferred settings of the components 16-22 of the article of furniture 12 are stored in the memory of the receiver 28. When the user approaches the article of furniture 12, the sensor constituting the controller 34 is detected by the receiver 28. If the user then enters an input into the receiver 28, for example, by operating one of the buttons 64 of the sensors 30 or 32, the components 16-22 of the article of furniture 12 are displaced relative to the base 14 into that user's preferred setting.

Figure 4:
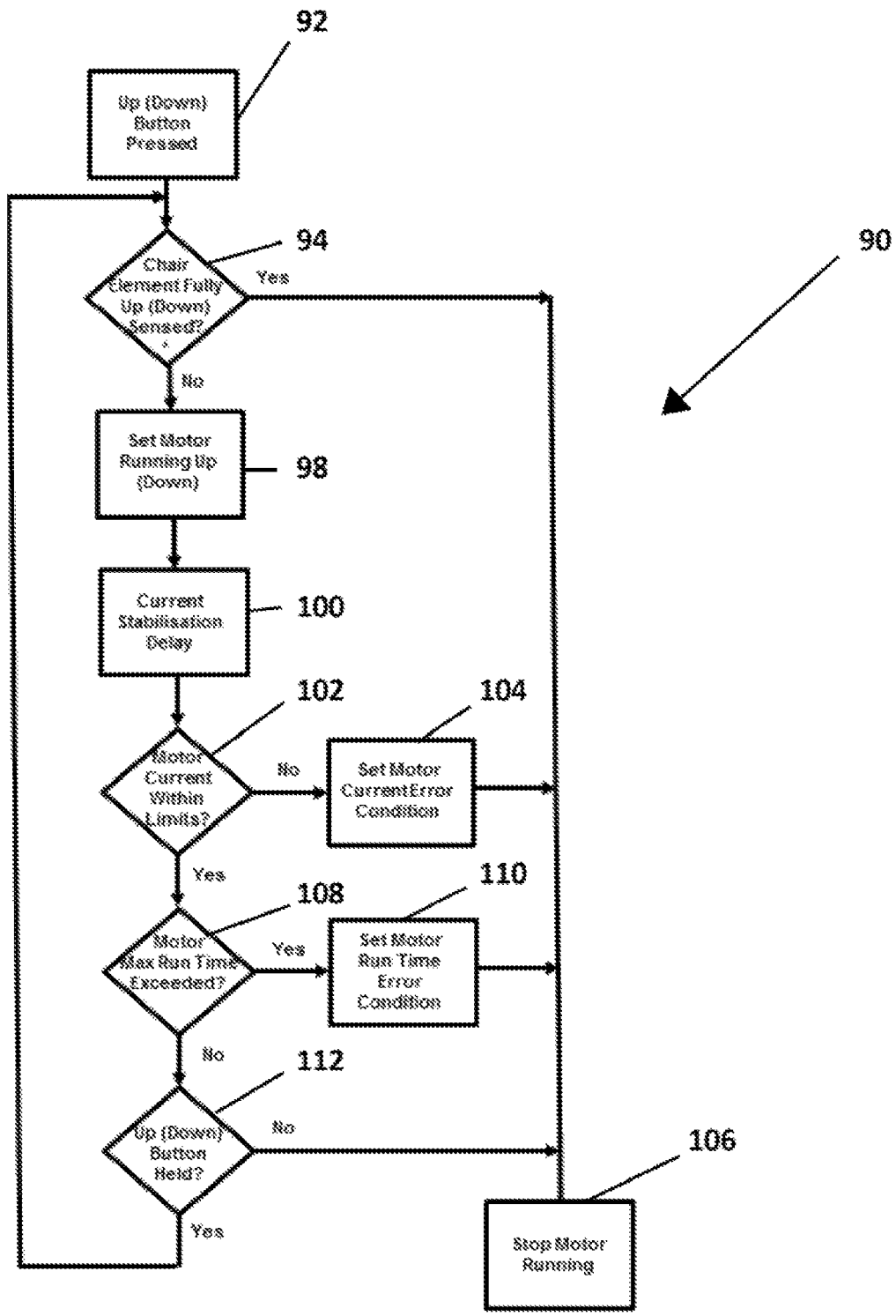
FIGS. 4 to 7 show flow charts of embodiments of a method of operating an article of furniture.

Referring now to FIGS. 4-7 of the drawings, different methods of operating the article of furniture 12 are described. In FIG. 4, reference numeral 90 generally designates a flow chart of the basic operation of the article of furniture 10. At 92, the microcontroller 50 of the receiver 28 queries whether or not a button 64 (or sensor 65 in the case of the embodiment of FIG. 8) of one of the sensors 30, 32 has been actuated or whether or not a command has been received from the controller 34.

The microcontroller 50 checks whether or not the relevant component is in a fully up or down position as shown at 94 by means of sensors 96 (FIG. 2). In this embodiment, the sensors 96 are limit switches. If not, the microcontroller 50 sets the relevant motor 24 or 26 running as shown at 98.

It will be appreciated that, when the user controls operation of the article of furniture 12 via the controller 34, the user will often not be within sight of the article of furniture 12. The user may not know that a young child, infant or pet has crawled into the article of furniture 12 and that by operating the article of furniture 12, an injury could result. The system 10 thus includes a safety interlock or an anti-entrapment feature to inhibit the likelihood of injury being caused to young children and/or pets as described in the following paragraphs.

After a current stabilisation delay 100, the microcontroller 50 assesses whether or not the motor 24, 26 is running within its rated current limits as shown at 102. If not, the microcontroller 50 sets a current error fault condition as shown at 104 and stops the motor running as shown at 106. If the motor 24, 26 is running within limits, the microcontroller then queries if the maximum runtime of the motor 24, 26 has been exceeded as shown at 108. If it has, a runtime error condition is set as shown at 110 and the microcontroller 50 again stops the motor running as shown at 106.

It is to be noted that the motor current limit is a fixed value for an up operation and a different fixed value for a down operation for the relevant component 16-22 of the article of furniture 12. Further, the motor runtime limit is a fixed value for the up operation and a different fixed value for the down operation.

Finally, as shown at 112, the microcontroller 50 continues to poll the sensors 30, 32 to determine whether or not the desired operation has or has not been completed.

Figure 5:
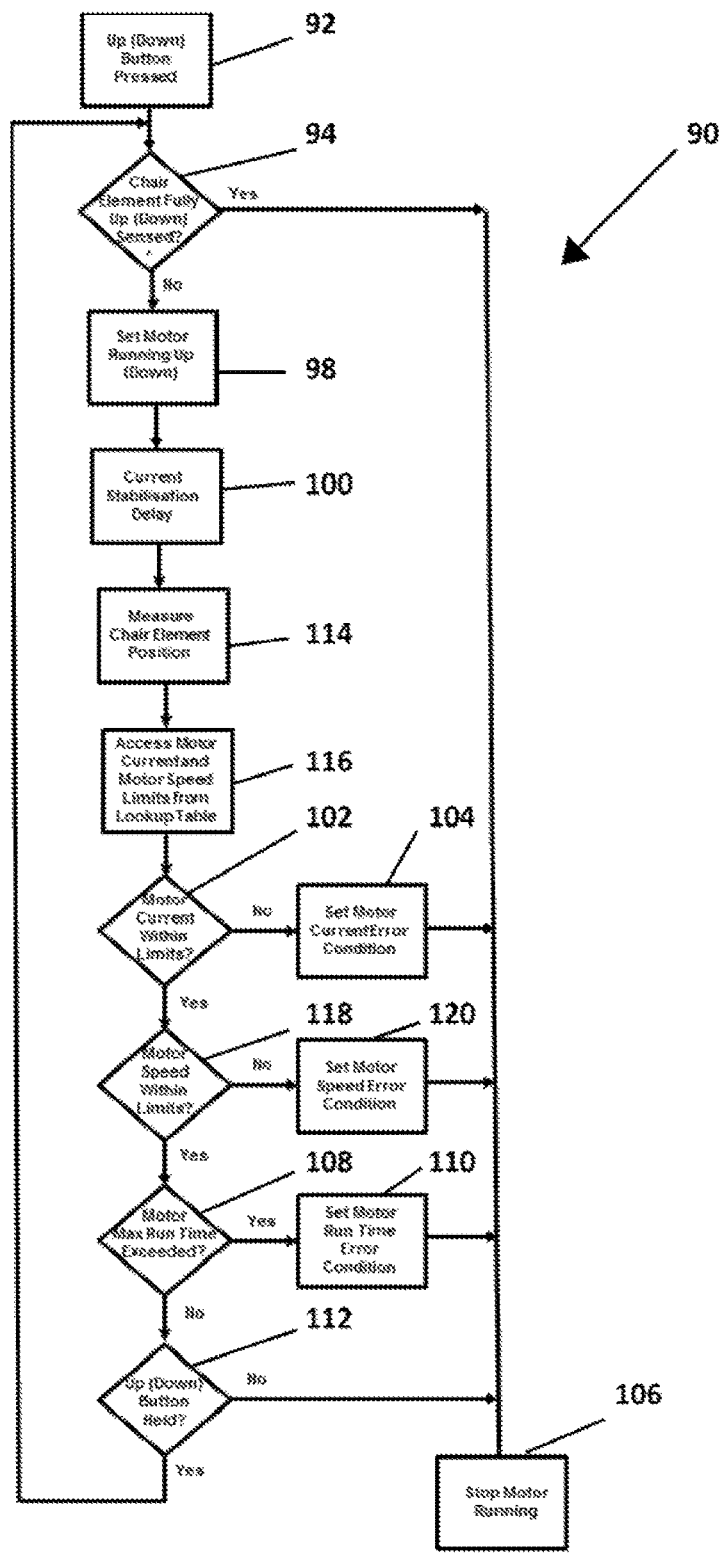

FIG. 5 shows a flow chart of a second embodiment of a method of operating the article of furniture 12. With reference to FIG. 4 of the drawings, like reference numerals refer to like parts, unless otherwise specified.

The fully up or down position of the relevant component 16-22 of the article of furniture 12 is determined by the sensors 96, which, in this embodiment, are position sensors. These position sensors are each in the form of an incremental encoding unit in conjunction with a limit position reference or an absolute positioning encoder. The position of the relevant component is sensed via the position sensors 96 as shown at 114 and motor current and motor speed limits are accessed by the microcontroller 50 from a lookup table as shown at 116.

In addition to sensing current limits of the motor 24, 26 and maximum runtime, the microcontroller 50 also senses speed of the motor 24, 26 as shown at 118. If the speed is not within limits, a motor speed error fault condition is set by the microcontroller 50 as shown at 120 and the microcontroller 50 stops the motor 24, 26 running as shown at 106.

Figure 6:
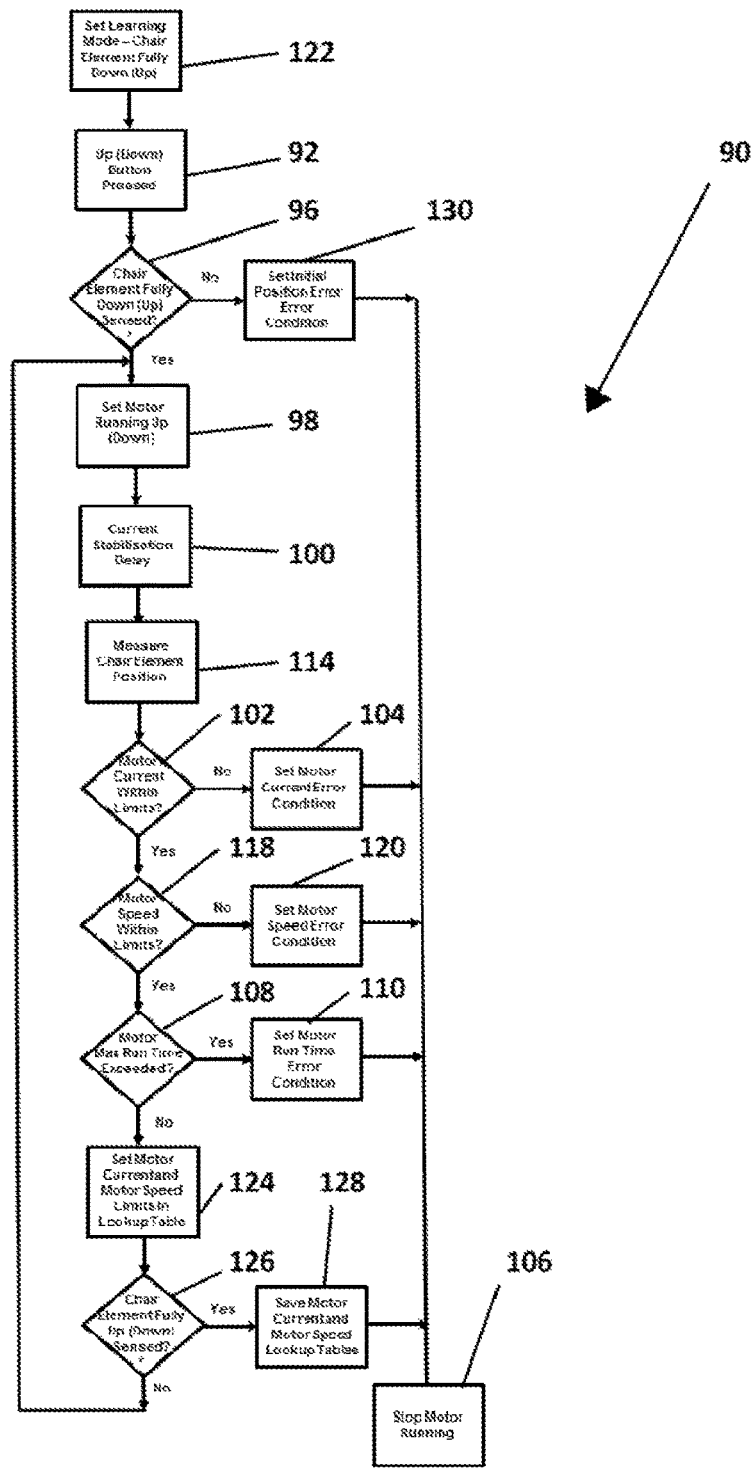

FIG. 6 shows still a further embodiment of a method of operating the article of furniture 12. Once again, with reference to FIGS. 4 and 5 of the drawings, like reference numerals refer to like parts, unless otherwise specified.

In this embodiment, motor current and speed lookup tables are learned for each different article of furniture to allow variability from unit to unit to be removed. As shown at 122, an initial step involves setting a learning mode where the position sensors 96 sense the position of the relevant component 16-22 of the article of furniture 12 and implement motor current measurement facilities. After the microcontroller 50 has checked motor current limits, motor speed limits and motor runtime limits, the microcontroller 50 sets the motor current and motor speed limits in a lookup table as shown at 124 and then determines whether the relevant component 16-22 is in a fully up or down position as sensed by the position sensors 96 as shown at 126. If the microcontroller 50 determines that the component is fully up or down, as the case may be, the current and speed settings are saved in the lookup table as shown at 128.

In this regard, it is also to be noted that, if the microcontroller 50 determines, in the initial state that the component is not fully up or down (step 94), it sets an initial position error condition as shown at 130.

Figure 7:
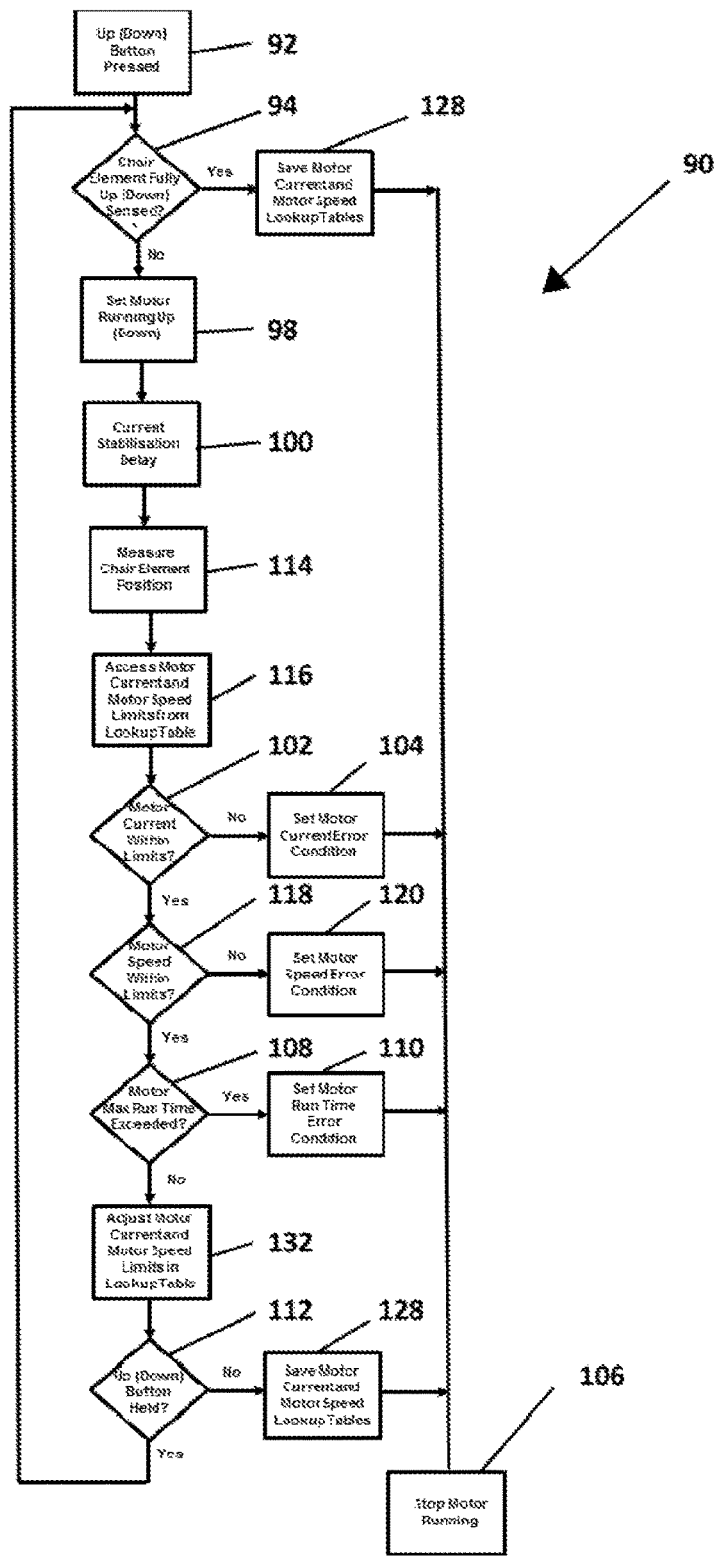

Referring now to FIG. 7 of the drawings, yet a further embodiment of a method of operating the article of furniture 12 is illustrated. As with FIGS. 4-6 of the drawings, like reference numerals refer to like parts, unless otherwise specified. In this embodiment, the microcontroller 50 effects adaptive adjustment during furniture operation to minimise variability due to wear and lubrication degradation.

In this case, the microcontroller 50 adjusts the motor current and motor speed limiting lookup table as shown at 132. This is effected gradually from the present values to adapt the limit to changing operating conditions, for example, as caused by wear or increased friction due to lubrication degradation.

It is therefore an advantage of the described embodiments that a system 10 is provided which allows for remote operation of articles of furniture. In addition, accessories (not shown) associated with the articles of furniture such as lamps, speakers, or other electrically powered devices can be operated by the controller 34 even when the user is away from the article of furniture 12.

Thus, for example, a user can, using the controller 34, set the article of furniture 12 to the user's preferred setting prior to the user arriving home. Simultaneously, the user can set the relevant accessories as desired via the controller 34.

Still further, the user can, via the controller 34, control multiple parts of composite furniture such as sofas and, using the controller 34, can set individual parts of the composite furniture and/or return all those parts to their retracted or stored positions, either when the user is in the vicinity of the furniture or is remote from the furniture.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An operating system for operating an article of furniture, the article of furniture comprising a support structure and at least one component displaceably arranged relative to the support structure, the operating system including:
    a proximity responsive interface carried by the article of furniture, the proximity responsive interface having a plurality of gesture responsive components to enable a user, by using predetermined gestures relative to the gesture responsive components, to control displacement of the at least one component of the article of furniture relative to the support structure; and a signal processing module responsive to the proximity responsive interface, the signal processing module incorporating a memory device storing a preferred setting of the at least one component, wherein the signal processing module is configured to:

store the preferred setting in response to a first predetermined manipulation sequence of gestures, the first predetermined manipulation sequence including touching at least one of the gesture responsive components in a predetermined fashion; and retrieve the preferred setting in response to a second predetermined manipulation sequence of gestures relative to at least some of the gesture responsive components of the proximity responsive interface, the first predetermined manipulation sequence being different from the second predetermined manipulation sequence.

2. The system of claim 1, wherein the predetermined gestures include touch gestures, and wherein each gesture responsive component includes a touch sensitive component.

3. The system of claim 2, wherein each touch sensitive component comprises a touch sensor, wherein the first predetermined manipulation sequence includes simultaneously touching a number of touch sensors for a predetermined first period of time to store the preferred setting, and wherein the second predetermined manipulation sequence includes touching the same number of touch sensors for a predetermined second period of time, the second period of time being different from the first period of time, to retrieve the preferred setting.

4. The system of claim 2, wherein each touch sensitive component includes a touch sensor, wherein the first predetermined manipulation sequence includes touching at least one of the touch sensors a predetermined first number of times and with a predetermined first cadence to store the preferred setting and wherein the second predetermined manipulations sequence includes touching at least one of the touch sensors a predetermined second number of times, different from the predetermined first number of times, and with a predetermined second cadence, different from the predetermined first cadence, to retrieve the preferred setting.

5. The system of claim 1, wherein each gesture responsive component includes a proximity sensitive component.

6. The system of claim 5, wherein each proximity sensitive component includes a proximity sensor, wherein the second predetermined manipulation sequence includes a user swiping his or her hand contactlessly past at least one of the proximity sensors in a first direction to retrieve the preferred setting for that user and the user swiping his or her hand contactlessly past at least one of the proximity sensors in a second direction to return the article of furniture to a home position.

7. The system of claim 6, wherein the memory device stores a plurality of preferred settings, and wherein each of the plurality of preferred settings are accessible from the memory device by a respective user swiping his or her hand contactlessly past the at least one proximity sensor in the first direction a predetermined number of times.

* * * * *